June 12, 1934.  H. SCHRADER  1,962,286
METHOD OF ATTACHING BAILS TO CONTAINERS
Filed May 11, 1933
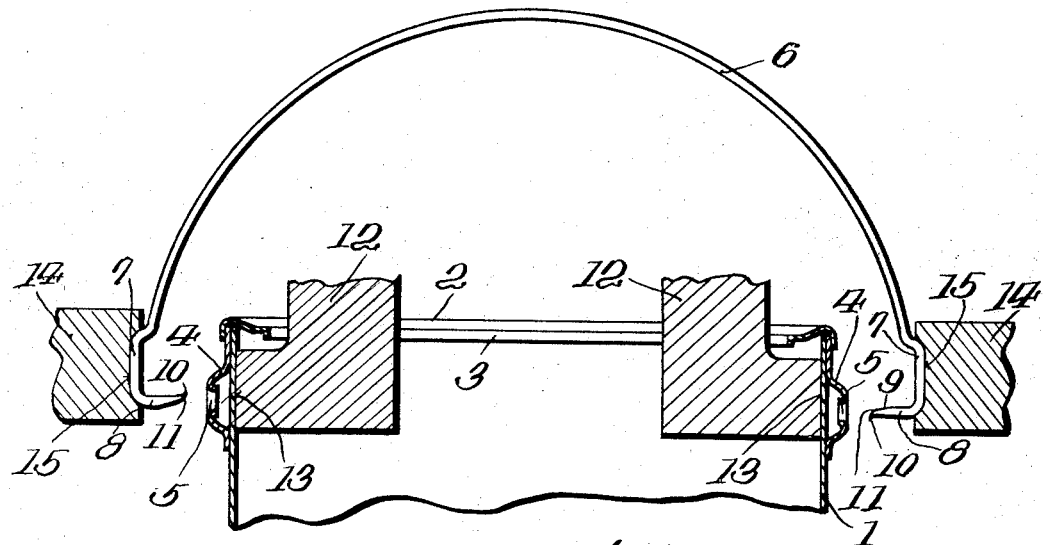
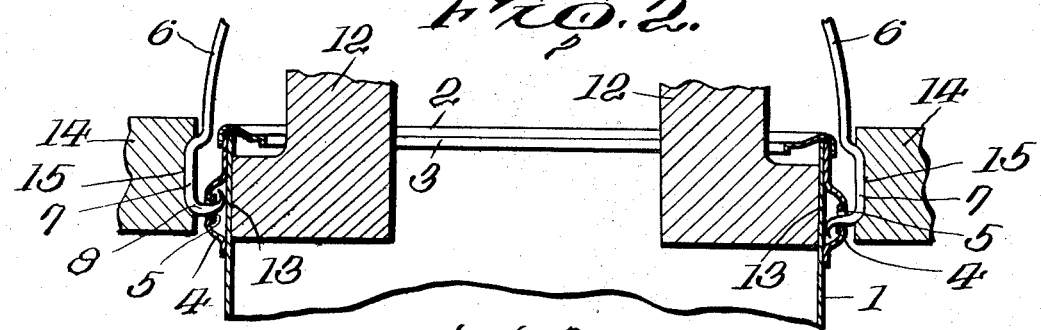
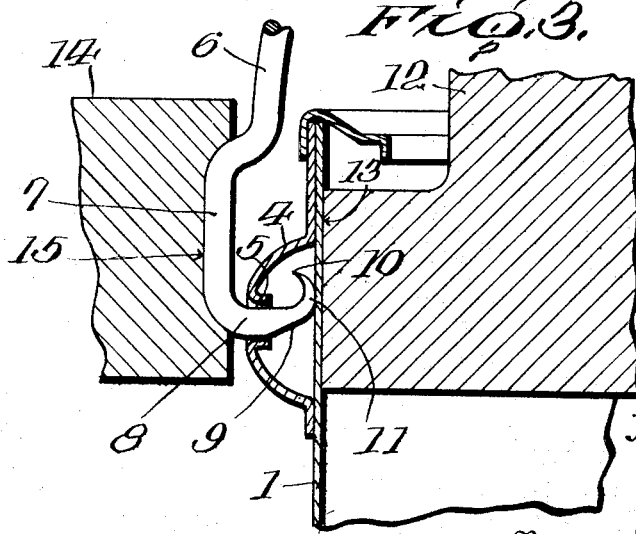
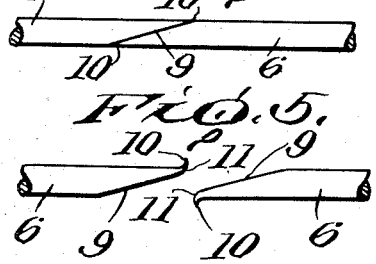
Inventor
Herbert Schrader
By Sturtevant, Mason & Porter
Attorneys Patented June 12, 1934

1,962,286

UNITED STATES PATENT OFFICE 1,962,286

METHOD OF ATTACHING BAILS TO CONTAINERS

Herbert Schrader, Wheeling, W. Va., assignor to Continental Can Company, Inc., New York, N. Y., a corporation of New York Application May 11, 1933, Serial No. 670,573

2 Claims. (Cl. 140—93)

The invention relates to new and useful improvements in the method of attaching bails to container ears.

An object of the invention is to provide a method whereby the ends of the bail may be inserted through the opening in the ear and solely by pressure applied to the bail ends, reshape the bail ends within the ears so as to lock the bail to the ears, at the same time permitting said bail to freely swing on the container.

In the drawing—

Figure 1 is a view in vertical section showing the essential elements of the bail attaching means and the first step in the method of attaching the bail to the container;

Fig. 2 is a view similar to Fig. 1, but showing the bail ends completely attached to the container;

Fig. 3 is an enlarged view through one side of the container showing the structure and the arrangement of the parts as shown in Fig. 2;

Fig. 4 is a view showing the manner of severing the ear to form the bail ends, and Fig. 5 is a view showing two bail ends shaped for attachment to the container.

In carrying out the invention, a wire is cut to proper length for forming a bail. The wire is cut on a diagonal line, so that the end of the wire tapers to a point at one side of the wire. This point is curved outwardly and rearwardly to a slight extent so as to initiate a curl. The two ends of the bail are preferably tapered to the outside of the wire in opposite directions. The wire forming the bail is then curved and the end section offset and formed with right angle end portions. Each right angle end portion is preferably shaped so that the point lies in the plane of the bail, one point being at the upper side and the other at the lower side of the end portion when the bail is in vertical position. The container is provided with two diametrically opposed ears secured to the outer face of the container, and each ear is provided with a central opening therethrough. The wall of the container in the region of the ear is preferably unbroken. The bail is attached to the container through the aid of an expansible anvil which is placed within the container and brought into contact with the wall in rear of each ear. The bail is placed between punch members which are separated so as to receive the ends of the bail. Each punch member is provided with a recess for locating the bail end in a predetermined position relative to the punch member. The punch members are then moved forward for forcing the ends of the bail through the openings in the ears and for causing the ends of the bail to contact with the wall of the container. Further pressure will cause the ends to curl; one will curl upwardly and the other will curl downwardly, and this locks the bail to the container.

Referring more in detail to the drawing, the container to which the bail is to be attached, is illustrated in part, and consists of a body portion 1 having a top portion 2 secured thereto in any suitable way, and as shown, said top portion is provided with a friction seat adapted to receive a friction closing plug. Attached to the bail at diametrically opposite points are ears 4, 4, each of which is provided with a dome-shaped portion having an opening 5 centrally thereof. This ear may be attached to the bail in any suitable way. It is shown in the drawing as attached by a seam which joins the top portion of the container to the body portion 1 thereof. The bail which is to be attached to the container is formed of wire, and consists of a body portion 6 having end sections 7, 7 which are offset outwardly in the well-known way of forming bails. At the lower ends of these offset sections are bail ends 8, 8 which extend at right angles to the bail. This bail 6 is formed from wire, and when the wire is severed to form a bail, it is severed along the line 9 (see Fig. 4). This will produce one end of one bail and the other end of another bail. The cutting of the wire in the manner stated, produces a point 10 which is located in line with one side of the wire. In Fig. 5 of the drawing there is shown the two ends of the bail 6 which are brought close together, purely for the purpose of illustration. The point 10 on one end section is curved upwardly and outwardly, thus forming a part which will initiate a curl when pressure is applied endwise against the bail. This curved portion is indicated at 11. The other end of the bail has its point at the lower side instead of the upper side, and it is similarly shaped, as indicated at 11 so as to initiate a curl when pressure is applied thereto in an endwise direction.

Referring to Fig. 1, it will be noted that the curved portion 11 at the right of the bail curves downwardly, while the curved portion 11 at the left of the bail curves upwardly.

In order to attach the bail to the container, an expansible anvil is used consisting of two anvil sections 12, 12. These two anvil sections are moved toward each other so that they may be inserted through the opening in the container, after which they are expanded so as to bring the portion 13 thereof into contact with the inner face of the wall of the container directly in rear of the respective ear with which it is associated.

The apparatus for attaching the bail includes two punch members 14, 14, which are similarly constructed. Each punch member is provided with a recess 15 shaped to receive the offset portion 7 of the end of the bail. This is for the purpose of locating the bail relative to the punch members and for maintaining the bail in vertical position while it is being attached to the container. After the parts are assembled as shown in Fig. 1, then the punch members are simultaneously moved inwardly, and this will cause the bail ends 8 to enter the openings 5 and pass within the ears, bringing the curved portion 11 of the bail ends into contact with the outer face of the metal forming the body wall 1 of the container. Further pressure exerted on the punch members 14 will cause the curved ends 11 to initiate a curl. The end of the bail at the left will roll into a curved hook portion, the point of which is offset from the center line of the end of the bail a distance greater than the diameter of the opening 5. After the punches have released the bail and the anvil has been removed from within the container, the bail end is fixedly held in engagement with the ear, for the reason that any endwise movement of the bail end will be limited by this hook end on the bail end contacting with the inner face of the ear. The curved end 11 at the right causes the bail end to curve into a hook which faces downwardly and is dimensioned similar to that described in connection with the hook end at the other side of the container.

It will be noted that the point of the end of the bail is normally out of contact with the inner face of the ear, and it is the curved end of the bail which is sprung through the resiliency of the bail into contact with the wall of the container. The bail is free to swing in the ear, and this curved part will bear against the wall and readily turn from one position to another. The position of the bail end is not so important, as the essential feature is the forming of the hook which permanently secures the bail to the container, so that it cannot be separated therefrom without re-forming the wire and the straightening out of the end portion of the bail. This provides a very simple and efficient manner of attaching a bail to a container, so that the bail will be permanently secured thereto. It will be understood that the curled portions on the ends may be otherwise positioned than shown in the drawing without departing from the spirit of the invention which consists in the reinforcing of the metal wall of the container and the using of the same as a shaping member for shaping the ends of the bails when they are forced through the openings in the ears and into contact with the outer face of the wall. A further essential feature of the invention is the shaping of the bail ends so that by pressure alone they may be caused to curl into locking hooks for permanently securing the bail ends to the containers.

Having thus described the invention, what I claim as new and desire to secure by Letters-Patent, is—

1. The method of attaching bails to container ears consisting in forming right angle end portions on the bail with the extreme ends thereof curved at an angle to the end portion so as to initiate a curl in said end portion when it is forced endwise against the wall of the container, inserting the bail ends through the openings in the ears so that said ends contact with the wall of the container, and applying pressure to the bail ends for forcing the same against said wall and thereby curling the end portions of the bail to form laterally extending portions which prevent the bail ends from being withdrawn from the openings in the ears.

2. The method of attaching bails to container ears consisting in forming right angle end portions on the bail with the extreme ends thereof curved at an angle to the end portion so as to initiate a curl in said end portion when it is forced endwise against the wall of the container, placing an anvil in the container against the wall of the container in the region of the bail ear, inserting the bail ends through the openings in the ears so that said ends contact with the wall of the container, and applying pressure to the bail ends for forcing the same against said wall and thereby curling the end portions of the bail to form laterally extending portions which prevent the bail ends from being withdrawn from the openings in the ears.

HERBERT SCHRADER.